US009112587B2

United States Patent
Ferchland et al.

(10) Patent No.: US 9,112,587 B2
(45) Date of Patent: *Aug. 18, 2015

(54) TRANSMITTING/RECEIVING DEVICE AND METHOD FOR TRANSMITTING DATA IN A RADIO NETWORK

(71) Applicant: Atmel Corporation, San Jose, CA (US)

(72) Inventors: Tilo Ferchland, Dresden (DE); Sascha Beyer, Medingen (DE); Frank Poegel, Dresden (DE); Thomas Hanusch, Coswig (DE)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/065,165

(22) Filed: Oct. 28, 2013

(65) Prior Publication Data

US 2014/0050256 A1 Feb. 20, 2014

Related U.S. Application Data

(63) Continuation of application No. 13/046,557, filed on Mar. 11, 2011, now Pat. No. 8,571,490.

(60) Provisional application No. 61/313,317, filed on Mar. 12, 2010.

(30) Foreign Application Priority Data

Mar. 12, 2012 (DE) .......................... 10 2010 011 343

(51) Int. Cl.
*H04B 1/44* (2006.01)
*H04B 1/401* (2015.01)
*H04B 7/06* (2006.01)
*H04B 7/08* (2006.01)
*H04W 4/00* (2009.01)

(52) U.S. Cl.
CPC .............. *H04B 1/401* (2013.01); *H04B 7/0608* (2013.01); *H04B 7/0805* (2013.01); *H04W 4/008* (2013.01)

(58) Field of Classification Search
CPC ....................................................... H04B 1/401
USPC ........... 455/78, 419, 432.3, 435.2, 517, 552.1
See application file for complete search history.

(56) References Cited

U.S. PATENT DOCUMENTS

| | | | | |
|---|---|---|---|---|
| 7,146,134 | B2 * | 12/2006 | Moon et al. | ................. 455/67.11 |
| 7,609,648 | B2 * | 10/2009 | Hoffmann et al. | ............. 370/252 |
| 2005/0265482 | A1 | 12/2005 | Peek et al. | |

FOREIGN PATENT DOCUMENTS

DE         102005049931 B4    4/2009

OTHER PUBLICATIONS

German Office Action, File No. 10 2010 011 343.3-35, Ref: 1704 DEO, dated Nov. 15, 2010, application date Mar. 12, 2010.
Translation of German Office Action, File No. 10 2010 011 343.3-35, Ref: 1704 DEO, dated Nov. 15, 2010, application date Mar. 12, 2010.
Response to the examination opinion of Nov. 15, 2010; File No. 10 2010 011 343.3-35 dated Jan. 1, 2011 WM/KM/2, application date Mar. 12, 2010, Ref: 1704 DEO.

* cited by examiner

*Primary Examiner* — Tuan H Nguyen
(74) *Attorney, Agent, or Firm* — Fish & Richardson P.C.

(57) ABSTRACT

In certain embodiments, an apparatus includes circuitry coupled to a switch between a first and second antenna of a device. The circuitry generates a first control signal for the switch to couple a transceiver of the device to the first antenna for transmission of a first data frame. The circuitry determines whether the transceiver has received, within a pre-determined time interval after transmission of the first data frame, a second data frame containing an acknowledgement message confirming successful receipt of the first data frame by another device. The circuitry generates, if the transceiver has not received the second data frame within the pre-determined time interval, a second control signal for the switch to couple the transceiver to the second antenna for re-transmission of the first data frame. An output line of the apparatus couples the circuitry to the switch and communicates the first or second control signal to the switch.

20 Claims, 2 Drawing Sheets

TRANSMITTING/RECEIVING DEVICE AND METHOD FOR TRANSMITTING DATA IN A RADIO NETWORK

RELATED APPLICATION

This application is a continuation, under 35 U.S.C. §120, of U.S. patent application Ser. No. 13/046,557, filed 11 Mar. 2011, which claims the benefit, under 35 U.S.C. §119(e), of U.S. Provisional Patent Application No. 61/313,317, filed 12 Mar. 2010, which are hereby incorporated by reference. This application also claims the benefit, under 35 U.S.C. §119(a), of German Patent Application No. 102010011343.3-35, also filed 12 Mar. 2010.

TECHNICAL FIELD

This disclosure relates to a transmitting/receiving device for transmitting data to another transmitting/receiving device.

BACKGROUND

In particular embodiments, a transceiver is a device that includes a transmitter and a receiver.

DESCRIPTION OF EXAMPLE EMBODIMENTS

Figure 1:
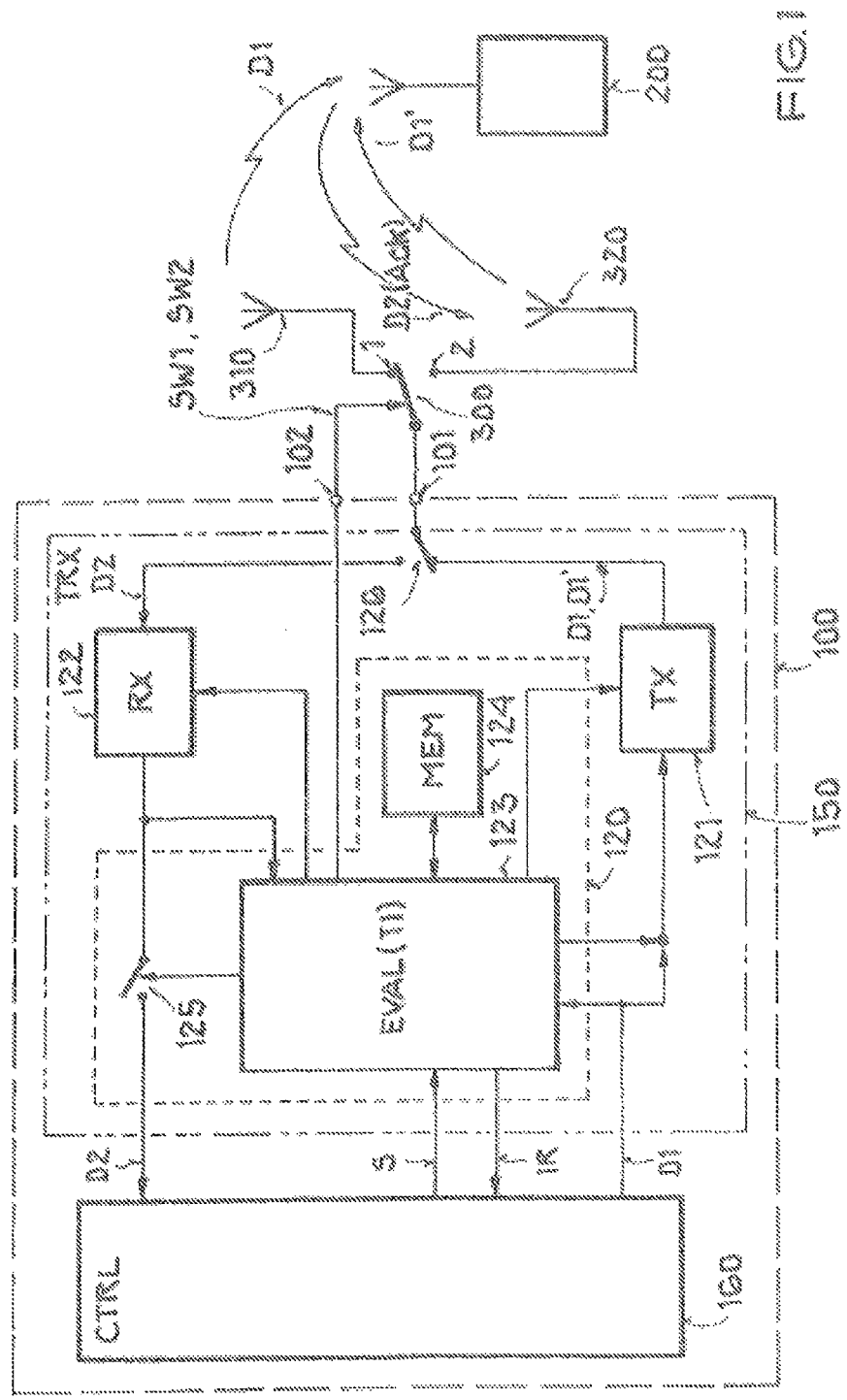
FIG. 1 is a schematic block diagram.

This disclosure relates to a transmitting/receiving device for transmitting data to another transmitting/receiving device and a method for transmitting data to another transmitting/receiving device in a radio network.

German Patent Application No. DE 102005049931 (which U.S. Pat. No. 7,596,365 claims priority to) describes a transmitting/receiving device having a controller, which is designed to not relay a data frame to a control unit if it is determined that the data frame contains an acknowledgement message.

One problem addressed by this disclosure is that of optimally improving a transmitting/receiving device for transmitting in a radio network.

According to particular embodiments, a transmitting/receiving device for transmitting data to another transmitting/receiving device in a radio network is provided. The Transmitting/receiving device is preferably monolithically integrated onto a semiconductor chip. The transmitting/receiving device for transmitting data is preferably embodied so as to conform to IEEE communications industry standard IEEE 802.15.4.

The transmitting/receiving device comprises a transmitting/receiving unit for connection to a first antenna and to a second antenna. The transmitting/receiving unit has a transmitting unit, which can be connected to the first antenna and to the second antenna, for transmitting data frames to the other transmitting/receiving device. The transmitting/receiving unit has a receiving unit for receiving data frames from the other transmitting/receiving device.

The transmitting/receiving device has a control unit, connected to the transmitting/receiving unit, for controlling the transmitting/receiving unit. The control unit is designed to instruct the transmitting/receiving unit to transmit a first data frame.

The transmitting/receiving unit has a controller, which is connected to the control unit and to the receiving unit and to the transmitting unit. The controller has a control output. The controller is designed to control a switchover between the first antenna and the second antenna by sending out a first control signal assigned to the first antenna and a second control signal assigned to the second antenna at the control output.

The controller is configured to send out the first control signal for transmitting the first data frame.

The receiving unit of the transmitting/receiving unit is configured to receive a second data frame.

The controller is designed to evaluate the second data frame and to determine whether the second data frame was received within a predefined time interval after the transmission of the first data frame via the first antenna. The controller is also designed to determine whether the second data frame contains an acknowledgement message confirming the successful receipt of the first data frame by the other transmitting/receiving device.

The controller is configured to send out the second control signal for a switchover between the antennas, and to retransmit the first data frame to the other transmitting/receiving device via the second antenna if a second data frame does not contain the acknowledgement message within the predefined time interval.

Another problem addressed by this disclosure is that of providing an optimally improved method for transmitting data.

According to particular embodiments, a method for transmitting data from one transmitting/receiving device to another transmitting/receiving device in a radio network is provided.

In the method, a transmitting/receiving unit of the transmitting/receiving device is instructed by a control unit of the transmitting/receiving device, for example, via a command, to transmit a first data frame.

In the method, a first control signal for switching a transmitting unit of the transmitting/receiving unit to a first antenna is sent out, wherein the first control signal is sent out by a controller of the transmitting/receiving unit for transmitting the first data frame.

The transmitting unit of the transmitting/receiving unit transmits the first data frame to the other transmitting/receiving device.

The transmitting/receiving unit receives and evaluates a second data frame.

The controller then determines whether the second data frame was received via the first antenna within a predefined time interval after the transmission of the first data frame. The controller also determines whether the second data frame contains an acknowledgement message confirming the successful receipt of the first data frame by the other transmitting/receiving device.

When a second control signal is sent out, a switchover is made from the first antenna to the second antenna, and the first data frame is retransmitted via the second antenna to the other transmitting/receiving device if a second data frame does not contain the acknowledgement message within the predefined time interval.

Particular embodiments described in what follows relate both to the transmitting/receiving device and to the method for transmitting data from one transmitting/receiving device to another transmitting/receiving device in a radio network.

In particular embodiments, it is provided that the control unit is configured to perform functions of the MAC layer. The MAC layer (medium-access-control) is an expansion of the OSI model proposed by the Institute of Electrical and Electronics Engineers (IEEE). The data-link layer (layer 2) in the OSI model is divided into the sublayers Media Access Control and Logical Link Control, with the MAC layer being the lower of the two.

In particular embodiments, the control unit is embodied to switch over to sleep mode after instructing the transmitting/receiving unit. In sleep mode, the control unit cannot perform any controlling function for controlling the transmitting/receiving unit. Therefore, the transmitting/receiving unit is autonomous in terms of transmitting and/or receiving data frames. The transmitting/receiving unit is preferably designed to wake the control unit out of sleep mode by means of an interrupt signal.

In an operating mode, the control unit is preferably embodied to receive data frames from the transmitting/receiving unit, which have been transmitted, for example, by the other transmitting/receiving device.

In particular embodiments, the transmitting/receiving unit is configured to perform functions of the physical layer (PHY) and the MAC layer of a communications standard. The MAC layer, as a component of the data-link layer, and the physical layer are defined, for example, by the OSI model. The physical layer can also be called the bit transfer layer. The transmitting/receiving unit is preferably configured to perform the functions of the physical layer (PHY) and parts of the functions of the MAC layer, even when the control unit is in sleep mode.

In particular embodiments, the transmitting/receiving unit has a memory for storing an identification signal of a connected antenna. The identification signal is assigned to the first antenna. When two or more antennas are physically present, the identification signal can be used to define one of these antennas as the first antenna, via which the first data frame will first be transmitted. Therefore, the identification signal can be used to select the first antenna, which in all probability will enable a transmission to the desired other transmitting/receiving device. In addition, various additional (receiving) transmitting/receiving devices can be assigned different identification signals for different antennas.

In particular embodiments, the transmitting/receiving unit is preferably configured to transmit the identification signal to the control unit. The transmitting/receiving unit first identifies the identification signal from the last successful transmission and stores it. Once the control unit has been woken up and switched from sleep mode to operating mode, the stored identification signal can be transmitted to the control unit, for example, and, together with a node identification signal for the other transmitting/receiving device, can be stored and optionally evaluated in the control unit.

In particular embodiments, the control unit is preferably designed to store the identification signal in the memory of the transmitting/receiving unit. By storing said signal in the memory of the transmitting/receiving unit, the control unit is able to specify which physically present antenna will first be used to transmit the first data frame. Said first antenna can be determined from previous transmissions.

Particular embodiments are particularly advantageous alone or in combination. It is also possible to combine additional variants with one another. A number of possible combinations are described herein. However, these possible combinations of further variants are not intended as limiting.

In what follows, particular embodiments are specified in greater detail in reference to examples, illustrated in the drawings.

FIG. 1 shows one example of a WPAN data transmission system according to IEEE communications standard 802.15.4. It comprises two transmitting/receiving devices 100, 200 in the form of stationary or mobile devices, which use radio signals to exchange information in a wireless manner. For this purpose, the transmitting/receiving device 100 is configured to transmit data to the other transmitting/receiving device 200 in the same radio network. The transmitting/receiving device 100 is a full-function device, which is capable of assuming the function of the WPAN coordinator. For example, the transmitting/receiving device 200 can be a reduced-function device, which is assigned to the full-function device 100 and is able to exchange data only with said device. The transmitting/receiving devices 100, 200 comprise multiple components, which are illustrated in functional blocks for the transmitting/receiving device 100. In the interest of clarity, the functional blocks in the transmitting/receiving devices 200 are not shown in detail, although they may be present in said devices.

The transmitting/receiving device 100 of the embodiment example of FIG. 1 can be connected via a connection 101 and via a high-frequency switch 300 to a first antenna 310 and to a second antenna 320. The transmitting/receiving device 100 is integrated, for example, as an integrated circuit on a semiconductor chip. As an alternative to the embodiment example of FIG. 1, the high-frequency switch 300 and/or the first antenna 310 and/or the second antenna 320 can be integrated together with the transmitting/receiving device 100 on the same semiconductor chip or together on a circuit carrier, such as a circuit board.

A transmitting/receiving unit 150 of the transmitting/receiving device 100 can be connected to the first antenna 310 and to the second antenna 320 via the connection 101. The transmitting/receiving unit 150 can also be called transceiver TRX. The transmitting/receiving unit 150 comprises a transmitter (TX) 121, which can be connected to the first antenna 310 and to the second antenna 320, for transmitting data frames D1, D1' to the other transmitting/receiving device 200. The transmitter 121 converts the data stream to be transmitted according to IEEE 802.15.4 to a radio signal to be broadcast via antenna 310 or 320. If the transmission will take place, for example, in the ISM frequency band at 2.4 GHz, the data stream to be transmitted is first converted to four-bit symbols, and these are converted to sequential, symbol value-specific PN (Pseudo Noise) sequences. In this case, the digital data, which will be modulated by the transmitting unit 121 to a carrier signal and emitted at the output of the transmitting unit 12 for one of the two antennas 310, 320, are present at the input of the transmitter 121. Thus the transmitter 121 performs specific functions at the level of the physical layer (PHY). The first data frame D1 to be transmitted is thereby converted from a MAC frame to a longer PHY frame, since, for example, a synchronization header precedes it, so as to enable synchronization to the data stream at the receiver end.

The transmitting/receiving device 100 further comprises a receiver (RX) 122, for receiving data frames D2 from the other transmitting/receiving device 200. In the embodiment example of FIG. 1, data are transmitted and received in conformance with the communications standard IEEE 802.15.4. The receiver 122 converts a radio signal, generated according to IEEE 802.15.4 and received from an antenna 310, 320, ideally without errors, according to the prescriptions of said standard, into the transmitted data by filtering the received radio signal, transforming it to the base band, demodulating it, and detecting the data (deciding), for example. Thus the receiver 122 also performs specific functions of the PHY layer. The received second data frame D2 in this case is converted from a PHY frame to a shorter MAC frame, since, for example, it lacks the synchronization header.

The transmitting/receiving device 100 of the embodiment example of FIG. 1 has a control unit 160, connected to the transmitting/receiving unit 150, for controlling the transmitting/receiving unit 150. The control unit 160 is embodied, for example, as a microcontroller. In addition, the transmitting/receiving unit 150 is embodied, for example, as an ASIC (application specific integrated circuit). Transmitting/receiving unit 150 and control unit 160 are preferably embodied as a single integrated circuit.

The transmitting/receiving unit 150 and the control unit 160 are supplied with power by an energy supply unit in the form of a battery, for example, which is not shown in FIG. 1, and which may also supply power to additional components, such as sensors, actuators, etc.

The control unit 160 is designed to instruct the transmitting/receiving unit 150 of "its" transmitting/receiving device 100 to transmit a first data frame D1 to the other transmitting/receiving device 200. The transmitting/receiving unit 150 has a controller 120 (EVAL), which is connected to the control unit 160 and to the receiver 122, and, in the embodiment example of FIG. 1, to the transmitter 121. The controller 120 is designed to receive from the control unit 160, for example, by means of a command S and/or by transmission of the first data frame D1, an instruction to transmit the first data frame D1 to the other transmitting/receiving device 200. It is further designed to transmit the first data frame D1 in the form of a MAC frame to the transmitter 121 and to instruct said transmitter to transmit D1, as is indicated schematically in FIG. 1 by arrows. Upon receiving such an instruction, the transmitting/receiving unit 150 of the transmitting/receiving device 100 then transmits the first data frame D1 to the other transmitting/receiving device 200.

If the other transmitting/receiving device 200 transmits a second data frame D2 back to the transmitting/receiving device 100, the second data frame D2 is received by the transmitting/receiving unit 150 of the transmitting/receiving device 100 and, if applicable, is relayed to the control unit 160 of the transmitting/receiving device 100, to be evaluated by the control unit 160. For this purpose, the controller 120 is advantageously configured to receive second data frames D2 in the form of MAC frames from the receiver 122 and, if applicable, to relay these to the control unit 160. In FIG. 1, this is illustrated by the arrows between controller 120 and receiver 122 and by the arrow labeled "D2" between controller 120 and control unit 160.

The transmitting/receiving unit 150 is designed to perform the functions of the physical layer of the communications standard. The control unit 160 is designed to perform at least a majority of the functions of the MAC (medium access control) layer of the communications standard. In addition to the specified functions at the level of the physical layer (PHY), the transmitting/receiving unit 150 also performs a number of functions specified at the level of the MAC layer of the communications standard—IEEE 802.15.4 in the embodiment example of FIG. 1. This makes it possible to use finite state machines to perform time-critical functions, which are actually defined at a higher level, in the physical layer (PHY) (bit transfer layer), without requiring the control unit 160—for example, a microcontroller—for this purpose. The control unit 160 is then charged "only" with the remaining functions of the MAC layer and, if applicable, with functions of higher layers. For this purpose, the control unit 160 is embodied, for example, to receive and evaluate second data frames D2 from the transmitting/receiving unit 150.

In addition, the controller 120 has a control output 102 for controlling a switchover between the first antenna 310 and the second antenna 320. To implement this, the controller sends out a first control signal SW1 (for example, an H potential) assigned to the first antenna 310 and a second control signal SW2 (for example, an L potential) assigned to the second antenna, at the control output 102. For the switchover, in FIG. 1, a high-frequency switch 300 is provided, to which the first antenna 310 and the second antenna 320 are connected.

In what follows, it is assumed that the first antenna is the antenna via which the first data frame D1 is first transmitted. In contrast, the second antenna is the antenna via which the first data frame D1' is first transmitted thereafter. The physical connection has no bearing on the identification as first or second antenna.

The controller 120 is configured to first send out the first control signal SW1 for the first-time transmission of the first data frame D1. The first data frame D1 requires an acknowledgement message ACK (ACKnowledgement)—which can also be called a receipt—from the other transmitting/receiving device 200 when said device receives the first data frame D1.

In particular embodiments, the transmitting/receiving unit 150 takes on functionalities specified at the MAC level of evaluating received second data frames D2 once the first data frame D1 has been transmitted. In this, the controller 120 evaluates a second data frame D2 received by the receiver 122, within a predefined time interval T1—between 150 µs and 500 µs, for example—after the transmission of the first data frame D1. In this evaluation, the controller 120 checks to see whether the second data frame D2 contains an acknowledgement message ACK confirming successful receipt of the first data frame D1 by the other transmitting/receiving device 200.

If it is determined during this check that D2 contains the acknowledgement message ACK, the controller 120 will not relay the second data frame D2 to the control unit 160, for example, by opening the switch element 125. This allows the control unit 160, which to conserve energy has at least two operating modes that consume different amounts of energy, to switch as quickly as possible to a low-energy "sleep mode," specifically as soon as it has instructed the transmitting/receiving unit 150 to transmit the first data frame D1.

The control unit 160 assumes that the data frame D1 will be successfully received by the second transmitting/receiving device 200.

The controller 120 is configured to use an evaluation unit 123 to evaluate a second data frame D2, received by the receiver 122 within the predefined time interval T1 after the transmission of the first data frame D1 via the first antenna 310. For this purpose, the evaluation unit 123 is connected to the receiver 122. The controller 120 determines whether the second data frame D2 contains an acknowledgement message ACK confirming the successful receipt of the first data frame D1 by the other transmitting/receiving device 200.

If the evaluation by the evaluation unit 123 of the controller 120 shows that within the predefined time interval T1 no second data frame D2 contains the acknowledgement message ACK, the controller 120 is configured to send out the second control signal SW2 for switching over between the antennas 310, 320, and for retransmitting the first data frame D1' to the other transmitting/receiving device 200 via the second antenna 320. There are several possible reasons why the acknowledgement message ACK would not be contained in a data frame D2. For example, the first data frame D1 may not have been received by the other transmitting/receiving device 200 due to inadequate transmission conditions.

In the example of FIG. 1, the controller 120 is configured to call for a retransmission of the first data frame D1, D1' without instruction by the control unit 160, wherein after each retransmission, a check is made to determine whether a received second data frame D2 contains an acknowledgement message ACK. In this, the transmitter 121 retransmits the first data frame D1' to the other transmitting/receiving device 200, if no second data frame D2 contains the acknowledgement message ACK within the predefined time interval T1. In addition, the controller 120 is configured to switch over between the antennas 310 and 320 for each retransmission. During the retransmission of the first data frame D1' the control unit 160 remains in sleep mode.

The controller 120 has a memory 124 (MEM). The first data frame D1 is stored in the memory 124 for the retransmission. The controller 120 is configured to store an identification signal for an antenna for the control signal SW1, SW2 in the memory 124. The identification signal is assigned to the antenna (310 or 320), for example, via which the first data frame D1 was successfully transmitted—as proven by the received acknowledgement message ACK. Once the control unit 160 has been woken up and switched from sleep mode to operating mode, the identification signal can be transmitted to the control unit 160.

The controller 120 preferably has a repetition counter, which counts the number of times the first data frame D1 is transmitted. If a count from the repetition counter exceeds a threshold value, the control unit 160 is woken up from sleep mode by an interrupt signal IR and is switched to the operating mode, and the controller 120 transmits status information about the exceeded threshold to the control unit 160. Thus, the controller 120 is configured to inform the control unit 160, for example, by the interrupt IR, only if an acknowledgement message ACK is not contained in a received second data frame D2 even after a predefined number of retransmissions of the first data frame D1. Said retransmissions are not called for individually by the control unit 160, and instead, the repeated transmissions of the first data frame D1 are controlled autonomously by the controller 120. This allows the control unit 160 to remain in sleep mode.

The control unit 160 is designed to leave the sleep mode when it receives the interrupt IR from the controller 120. The controller 120 is set up to inform the control unit 160 by means of the interrupt IR if, within the predefined time interval T1, no second data frame D2 is received, or if it is determined that each second data frame D2 does not contain the acknowledgement message ACK.

The first data frame D1 is transmitted first via the first antenna 310. The first antenna 310 is defined in this case by an assignment to one of two physically present antennas. For this purpose, the identification signal of one of the antennas is stored in the memory 124. For example, the identification signal defines one of the antennas as the default first antenna 310. The controller 120 or the control unit 160 is preferably configured to establish the identification signal for the first antenna 310 in the memory 124 by writing the identification signal. For example, the control unit 160 or the controller 120 uses previous transmissions of the first data frame D1, confirmed by an acknowledgement message ACK, to identify said antenna as the first antenna 310. In this case, a transmission via the same antenna can probably be performed with the same favorable transmission conditions as the previous transmission. This applies particularly to stationary transmitting/receiving devices.

In particular embodiments, the identification signal stored in the memory 124 as the signal for the first antenna 310 is the signal for the antenna for which an open transmission channel was most recently identified—for example, by means of a CCA process.

Advantageously, the control unit 160 or the controller 120 is configured to evaluate incoming signals of the two antennas from a received second data frame D2, in order to identify one of the antennas for the best reception. From said evaluation of the incoming signals, the antenna for a subsequent transmission of the first data frame D1 is also chosen, and its identification signal is stored in the memory 124 for specifying the first antenna 310.

Figure 2:
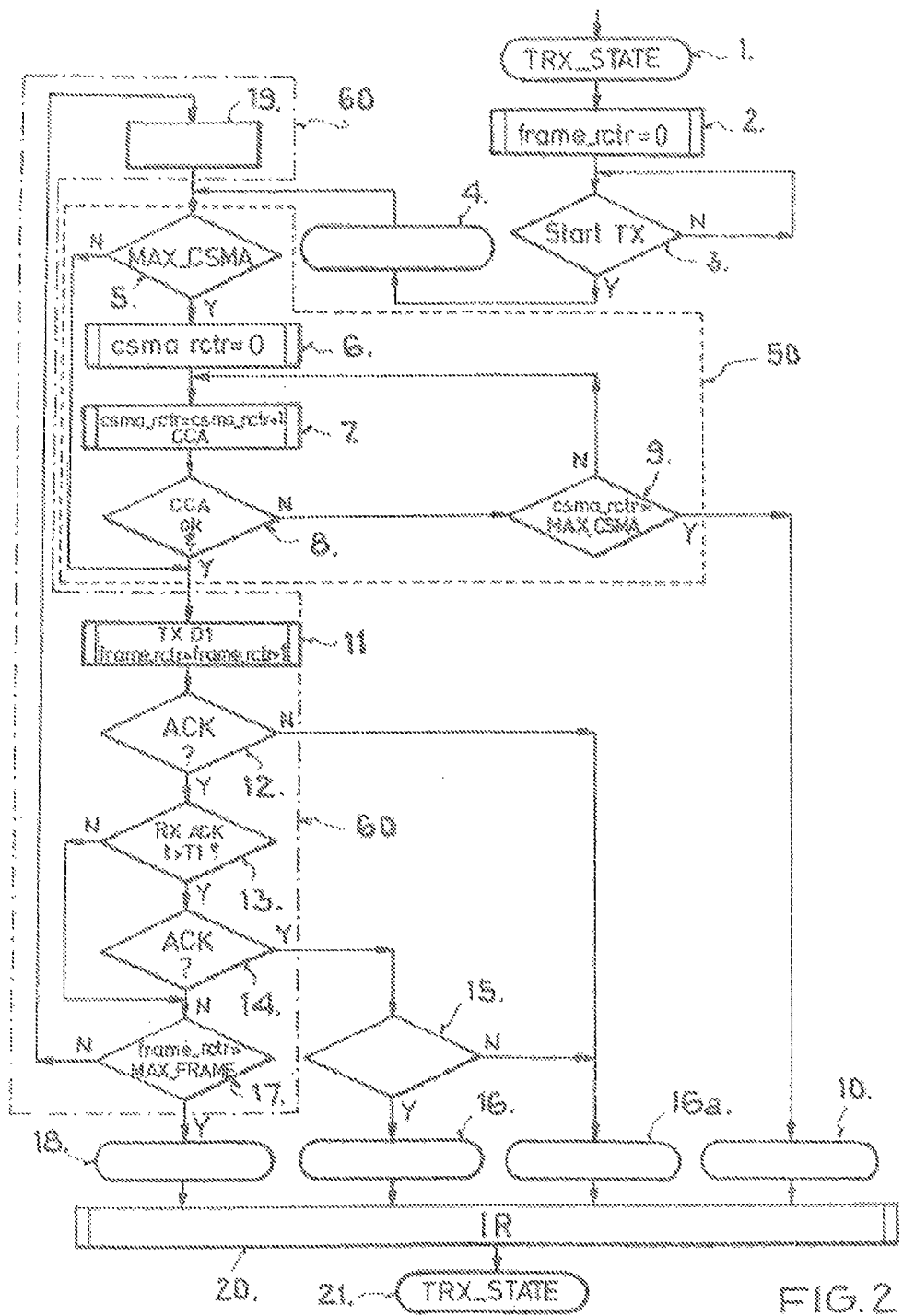
FIG. 2 is a schematic flow chart.

FIG. 2 shows a schematic flow chart illustrating the sequence of steps in a method. The sequence of steps can be implemented, for example, using a finite state machine as the hardware of the controller 120.

In a first step 1, a transmitting mode TRX_STATE is started. In this mode, a control unit 160—for example, a microcontroller—instructs a transmitting/receiving unit 150, by means of a command S, to transmit a first data frame D1. Also in the first step 1, an identification signal of an antenna as the first antenna 310 can be transmitted by the control unit 160 to the transmitting/receiving unit 150. After giving the instruction, the control unit 160 can switch to a sleep mode in the first step 1. The subsequent steps are a component of the MAC layer and the bit transfer layer and are performed, up to step 20, exclusively by the transmitting/receiving unit 150.

In the second step 2, a controller 120 of the transmitting/receiving unit 150 sets a counter value frame_rctr to zero. In the subsequent step 3, a check is made to determine whether a transmission of the first data frame D1 is possible, or whether, for example, at that moment a second data frame D2 is being received. This check is made repeatedly until a transmission TX of the first data frame D1 is possible. In the next step 4, the transmitting/receiving unit 150 is placed in "active transmitting mode" status.

In the subsequent steps 5, 6, 7, 8 and 9 of group 50, checks are made to determine whether a transmission channel is open for transmitting the first data frame D1. For this purpose, the controller 120 is configured to instruct a receiver 122 of the transmitting/receiving unit 150 to check whether the transmission channel intended for transmission of the first data frame D1 is occupied. The controller 120 is configured to instruct a transmitter 121 of the transmitting/receiving unit 150 to transmit the first data frame D1 only if the check shows that the intended transmission channel is open.

One example of a method of this type is the CSMA/CA method (carrier sense multiple access/collision avoidance), which can be used, for example, in communications standard IEEE 802.15.4. For collision avoidance when accessing the radio interface, a CSMA/CA algorithm is used. In step 5, a check is first made to determine whether the maximum number MAX_CSMA of repetitions of the CSMA/CA process is below a threshold value, which in the embodiment example of FIG. 2 is seven. In step 6, a count value csma_rctr is set to zero.

Before transmitting, the transmitting/receiving unit 150 checks to determine whether another device is currently transmitting on the selected channel, by measuring a signal from the antenna. In step 7, a CCA process (clear channel assessment) with the CCA modes 1, 2 or 3 in the communications standard IEEE 802.15.4 is used for this purpose. Also in step 7, the count value csma_rctr is increased by one to csma_rctr+1. If the channel is open in step 8, transmission of the first data frame D1 begins in step 11. If the channel is not open, a check is made in step 9 to determine whether the count value csma_rctr is greater than the maximum number MAX_CSMA. If the count value CSMA_rctr is not greater, the device will expect a random time interval in step 7 and will perform a repeated "channel open test" in step 7, wherein the count value CSMA_rctr is again increased by one. If the count value CSMA_rctr is greater than the maximum number MAX_CSMA, a status message is generated in step 10, which is relayed in the form of an interrupt IR to the control unit 160 in step 20. The current transmitting/receiving status TRX_state is determined similarly in step 21.

Step 11 is the first step of group 60. In step 11, the first data frame D1 is transmitted via the first antenna 310 and a frame counter frame_rctr is increased by one to frame_rctr+1. To control the transmission of the first data frame D1 via the first antenna, the controller 120 sends out a first control signal SW1. If the first data frame D1 does not require an acknowledgement message ACK, then after step 12, in step 16a, a status is established, which is transmitted by means of the interrupt IR in step 20 to the control unit 160.

In step 13, a second data frame D2 is received and checked to determine whether the second data frame D2 contains the acknowledgement message ACK. It is also checked to determine whether a specific time t of receipt of the acknowledgement message ACK lies within the time interval T1. If both apply, a check is made in step 14 to determine whether the acknowledgement message ACK is valid. In the next step 15, a check is made to determine whether there are additional data called up for transmission, and the status is set accordingly in step 16, or 16a.

If no second data frame D2 with an acknowledgement message ACK is received in step 13, or if the time t is already past the time interval T1, or if it is determined in step 14 that the acknowledgement message ACK is invalid, then step 17 will follow. In step 17 a check is made to determine whether the frame counter value frame_rctr is greater than a maximum value MAX_FRAME for the transmitted frame. If the maximum value MAX_FRAME is exceeded, in step 18 the status will be set to "no acknowledgement message ACK received" and in step 20 this will be transmitted to the control unit 160 by means of interrupt IR.

In contrast, if the maximum value MAX_FRAME is not reached in step 17, then in step 19 the second antenna 320 will be actuated, by the controller 120 sending out the second control signal SW2. Steps 5, 6, 7, 8 and 11 can then follow in turn, wherein in step 11 the first data frame D1' is transmitted via the second antenna 320. If the process proceeds through steps 12, 13/14 and 17 and again reaches step 19, a switchover will again be made to the first antenna 310 by sending out the first control signal SW1. In step 19, each time the series of steps 5, 6, 7, 8, 11, 12, 13, 14, 17 and 19 is performed, a switchover is made between the antennas 310, 320, in other words, from the first antenna 310 to the second antenna 320 or from the second antenna 320 to the first antenna 310. Rather than the embodiment examples illustrated in FIGS. 1 and 2 containing two antennas 310, 320, three or more antennas may also be provided, between which switchovers are made in a predefined sequence, for example.

With the example of FIG. 1, with various antenna positions of the first antenna 310 and the second antenna 320, the advantage may be achieved that a better transmission channel can be used when destructive interference leads to connection gaps in the transmission path for a specific antenna position. With the example of FIG. 1, however, the amount of power consumed is not substantially increased and remains substantially unchanged as compared with a single antenna. This is achieved by the fact that switching between the antennas requires no interaction with the control unit 160, which can remain in sleep mode even during switchovers between the antennas 310, 320.

This disclosure is not limited to the variants illustrated in FIGS. 1 and 2. For example, it is possible to provide three or more antennas, and to switch between them. It is also possible to switch between antennas 310, 320 for receiving. The functionality of the circuit according to FIG. 1 can be used to particular advantage for a universal radio system according to the industry standard IEEE 802.15.4 or alternatively IEEE 802.11 or alternatively IEEE 802.15.1.

The following is a list of reference symbols and numbers in FIGS. 1 and 2, provided for example illustration purposes only and not by way of limitation:

1-21 Process steps
100, 200 Transmitting/receiving device
101 Connection
102 Control output
120 Controller
121 Transmitter
122 Receiver
123 Evaluation unit
124 Memory
125 Switch element
150 Transmitting/receiving unit, circuit
160 Control unit
300 High-frequency switch
310, 320 Antenna
D1, D1', D2 Data frame
S Command
ACK Acknowledgement message
IR Interrupt, interrupt signal
SW1, SW2 Control signal
T1 Time interval

What is claimed is:

1. An apparatus comprising:
  circuitry coupled to a switch between a first antenna of a device and a second antenna of the device, the switch being configured to couple a transceiver of the device to the first antenna or the second antenna, the circuitry being configured to:
  generate a first control signal for the switch to couple the transceiver to the first antenna for transmission of a first data frame by the transceiver via the first antenna;
  determine whether the transceiver has received, within a pre-determined time interval after the transmission of the first data frame, a second data frame containing an acknowledgement message confirming successful receipt of the first data frame by another device; and
  generate, if the transceiver has not received within the pre-determined time interval after the transmission of the first data frame the second data frame, a second control signal for the switch to couple the transceiver to the second antenna for retransmission of the first data frame by the transceiver via the second antenna; and
  an output line coupling the circuitry to the switch and being configured to communicate the first or second control signal to the switch.

2. The apparatus of claim 1, wherein the circuitry comprises a controller and a control unit, the control unit having at least an operating mode and a sleep mode and configured to, while in the operating mode, send an instruction to the controller for the transceiver to transmit the first data frame and then enter the sleep mode.

3. The apparatus of claim 2, wherein the controller is configured to, without waking the control unit from the sleep mode, generate, if the transceiver has not received within the pre-determined time interval after the transmission of the first data frame the second data frame, the second control signal for the switch to couple the transceiver to the second antenna for re-transmission of the first data frame by the transceiver via the second antenna.

4. The apparatus of claim 2, wherein the controller is further configured to:
  receive an instruction for the transceiver to transmit the first data frame; and
  generate, if the transceiver has not received within the pre-determined time interval after re-transmission of the first data frame by the transceiver via the second antenna the second data frame, an interrupt signal to the control unit to exit sleep mode.

5. The apparatus of claim 1, wherein the circuitry is further configured to:
  set a repetition counter to a counter value of zero;
  increase the counter value by one when the transceiver transmits or re-transmits the first data frame;
  determine whether the counter value has reached a pre-determined threshold value; and
  change, if the counter value has reached the pre-determined threshold value, a transceiver status to indicate that the transceiver has not received a second data frame containing an acknowledgement message confirming successful receipt of the first data frame by another device.

6. The apparatus of claim 1, wherein the circuitry is further configured to:
  determine which one of two or more physical antennae of the device more recently had an open transmission channel;
  assign an identification signal to the one of the two or more physical antennae of the device that more recently had an open transmission channel;
  store the identification signal; and
  designate as the first antenna the one of the two or more physical antennae that more recently had an open transmission channel.

7. The apparatus of claim 1, wherein the device is configured to transmit the first data frame and the second data frame according to the Institute of Electrical and Electronics Engineers 802.15.4 standard.

8. A method comprising:
  generating, using circuitry coupled to a switch between a first antenna of a device and a second antenna of the device, the switch being configured to couple a transceiver to the first antenna or the second antenna, a first control signal for the switch to couple the transceiver to the first antenna for transmission of a first data frame by the transceiver via the first antenna;
  determining, using the circuitry, whether the transceiver has received within a predetermined time interval after the transmission of the first data frame a second data frame containing an acknowledgement message confirming successful receipt of the first data frame by another device; and
  generating, using the circuitry and if the transceiver has not received within the predetermined time interval after the transmission of the first data frame the second data frame, a second control signal for the switch to couple the transceiver to the second antenna for retransmission of the first data frame by the transceiver via the second antenna.

9. The method of claim 8, wherein the circuitry comprises a controller and a control unit, the control unit having at least an operating mode and a sleep mode and configured to, while in the operating mode, send an instruction to the controller for the transceiver to transmit the first data frame and then enter the sleep mode.

10. The method of claim 9, comprising generating, without waking the control unit from the sleep mode and if the transceiver has not received within the predetermined time interval after the transmission of the first data frame the second data frame, the second control signal for the switch to couple the transceiver to the second antenna for retransmission of the first data frame by the transceiver via the second antenna.

11. The method of claim 9, further comprising:
  receiving, at the controller, an instruction for the transceiver to transmit the first data frame; and
  generating, if the transceiver has not received within the pre-determined time interval after re-transmission of the first data frame by the transceiver via the second antenna the second data frame, an interrupt signal to the control unit to exit sleep mode.

12. The method of claim 8, further comprising:
  setting a repetition counter to a counter value of zero;
  increasing the counter value by one when the transceiver transmits or re-transmits the first data frame;
  determining whether the counter value has reached a pre-determined threshold value; and
  changing, if the counter value has reached the pre-determined threshold value, a transceiver status to indicate that the transceiver has not received a second data frame containing an acknowledgement message confirming successful receipt of the first data frame by another device.

13. The method of claim 8, further comprising:
  determining which one of two or more physical antennae of the device more recently had an open transmission channel;
  assigning an identification signal to the one of the two or more physical antennae of the device that more recently had an open transmission channel;
  storing the identification signal; and
  designating as the first antenna the one of the two or more physical antennae that more recently had an open transmission channel.

14. The method of claim 8, wherein the device is configured to transmit the first data frame and the second data frame according to the Institute of Electrical and Electronics Engineers 802.15.4 standard.

15. One or more computer-readable non-transitory storage media embodying logic that is configured when executed to:
  generate a first control signal for a switch between a first antenna of a device and a second antenna of the device to couple a transceiver to the first antenna for transmission of a first data frame by the transceiver via the first antenna, the switch being configured to couple the transceiver to the first antenna or the second antenna;
  determine whether the transceiver has received within a pre-determined time interval after the transmission of the first data frame a second data frame containing an acknowledgement message confirming successful receipt of the first data frame by another device; and
  generate, if the transceiver has not received within the pre-determined time interval after the transmission of the first data frame the second data frame, a second control signal for the switch to couple the transceiver to the second antenna for re-transmission of the first data frame by the transceiver via the second antenna.

16. The media of claim 15, wherein the logic is further configured to receive an instruction from a control unit to transmit the first data frame, the control unit having at least an operating mode and a sleep mode and configured to, while in the operating mode, send an instruction to a controller for the transceiver to transmit the first data frame and then enter the sleep mode.

17. The media of claim 16, wherein the logic is configured to generate, without waking the control unit from the sleep mode and if the transceiver has not received within the pre-determined time interval after the transmission of the first data frame the second data frame, the second control signal for the switch to couple the transceiver to the second antenna for re-transmission of the first data frame by the transceiver via the second antenna.

18. The media of claim 16, wherein the logic is further configured to generate, if the transceiver has not received within the pre-determined time interval after retransmission of the first data frame by the transceiver via the second antenna the second data frame, an interrupt signal to the control unit to exit sleep mode.

19. The media of claim 15, wherein the logic is further configured to:
  set a repetition counter to a counter value of zero;
  increase the counter value by one when the transceiver transmits or re-transmits the first data frame;
  determine whether the counter value has reached a pre-determined threshold value; and
  change, if the counter value has reached the pre-determined threshold value, a transceiver status to indicate that the transceiver has not received a second data frame containing an acknowledgement message confirming successful receipt of the first data frame by another device.

20. The media of claim 15, wherein the logic is further configured to:
  determine which one of two or more physical antennae of the device more recently had an open transmission channel;
  assign an identification signal to the one of the two or more physical antennae of the device that more recently had an open transmission channel;
  store the identification signal; and
  designate as the first antenna the one of the two or more physical antennae that more recently had an open transmission channel.

* * * * *